United States Patent
Tosco

(10) Patent No.: US 9,067,520 B2
(45) Date of Patent: Jun. 30, 2015

(54) SEAT BACKREST FOR A MOTOR VEHICLE

(75) Inventor: Franco Tosco, Orbassano (IT)

(73) Assignee: C.R.F. Societa' Consortile Per Azioni, Orbassano (IT)

( * ) Notice: Subject to any disclaimer, the term of this patent is extended or adjusted under 35 U.S.C. 154(b) by 108 days.

(21) Appl. No.: 13/548,315

(22) Filed: Jul. 13, 2012

(65) Prior Publication Data

US 2013/0015694 A1 Jan. 17, 2013

(30) Foreign Application Priority Data

Jul. 13, 2011 (EP) .................................... 11425187

(51) Int. Cl.
*B60N 2/48* (2006.01)
*B60N 2/68* (2006.01)

(52) U.S. Cl.
CPC .............. *B60N 2/686* (2013.01); *B60N 2/4808* (2013.01); *B60N 2/682* (2013.01); *B60N 2002/4897* (2013.01)

(58) Field of Classification Search
CPC ............ B60N 2/68; B60N 2/682; B60N 2/72
USPC ................ 297/452.65, 452.18, 452.2, 452.14
See application file for complete search history.

(56) References Cited

U.S. PATENT DOCUMENTS

| | | | | |
|---|---|---|---|---|
| 3,948,561 A * | 4/1976 | de Rosa | ......................... | 297/391 |
| 4,427,233 A * | 1/1984 | Matumoto | ..................... | 297/391 |
| 4,545,618 A * | 10/1985 | Kitamura | ...................... | 297/410 |
| 4,606,578 A * | 8/1986 | Yasui | ........................... | 297/408 |
| 4,695,097 A * | 9/1987 | Muraishi | .................. | 297/452.18 |
| 4,858,994 A * | 8/1989 | Yamashita | ..................... | 297/391 |
| 5,816,658 A * | 10/1998 | Wallis | ............................ | 297/410 |
| 6,074,010 A * | 6/2000 | Takeda | ........................... | 297/391 |
| 6,199,252 B1 * | 3/2001 | Masters et al. | ................. | 29/91.1 |
| 6,454,356 B1 * | 9/2002 | Yamada | ........................ | 297/410 |
| 6,484,997 B1 * | 11/2002 | Edwards et al. | ......... | 248/223.41 |
| 6,702,377 B2 * | 3/2004 | Nakano | .................... | 297/216.12 |
| 6,783,177 B1 * | 8/2004 | Nakano | .................... | 297/216.12 |
| 6,823,575 B2 * | 11/2004 | Petersen | ........................ | 29/509 |
| 6,832,816 B2 * | 12/2004 | Yamada | ........................ | 297/391 |
| 7,216,937 B2 * | 5/2007 | Key et al. | ................. | 297/452.18 |
| 7,318,626 B2 * | 1/2008 | Ohchi et al. | .................. | 297/410 |
| 7,434,886 B2 * | 10/2008 | Yamada | ........................ | 297/410 |
| 7,506,936 B2 * | 3/2009 | Saberan | ........................ | 297/410 |
| 7,716,797 B2 * | 5/2010 | Kismarton et al. | ............ | 29/91.1 |

(Continued)

FOREIGN PATENT DOCUMENTS

DE 10 2008 038 850 A1 2/2010
DE 20 2010 007 559 U1 7/2011

OTHER PUBLICATIONS

Kroener, Gregor; Machine Translation of German Patent Document DE 10 2008 038 850 A1; Feb. 18, 2010; all pages.*

*Primary Examiner* — Elizabeth A Plummer
(74) *Attorney, Agent, or Firm* — Dickstein Shapiro LLP

(57) ABSTRACT

A seat backrest for a motor vehicle is provided with a framework, supporting a padding covered with upholstery and has an upper crossbar, to which are attached two coupling members supporting respective rods of a headrest; the coupling members have respective guides, which are made of plastic material, have respective guide holes to be slidingly engaged by the rods, and are fixed to the upper crossbar directly by way of adhesive material; in particular the coupling members have respective holding portions snap coupled to the upper crossbar.

10 Claims, 2 Drawing Sheets

(56) References Cited

U.S. PATENT DOCUMENTS

| | | |
|---|---|---|
| 8,474,913 B2 * | 7/2013 | Line ................ 297/391 |
| 8,714,653 B2 * | 5/2014 | Yamada ............. 297/452.2 |
| 2003/0025380 A1 | 2/2003 | Vits et al. |
| 2005/0127736 A1 | 6/2005 | Ohchi et al. |
| 2008/0191539 A1 * | 8/2008 | Teufel et al. ........ 297/452.18 |
| 2011/0025115 A1 | 2/2011 | Tanaka |
| 2012/0139321 A1 * | 6/2012 | Wu ................ 297/391 |
| 2013/0033083 A1 * | 2/2013 | Sei et al. ............ 297/452.18 |

* cited by examiner

SEAT BACKREST FOR A MOTOR VEHICLE

The present invention relates to a seat backrest for a motor vehicle. In particular, this invention relates to a backrest of a rear seat, to which the following makes explicit reference nevertheless without loss of generality.

BACKGROUND OF THE INVENTION

As it is known, in motor vehicles the rear seats has a padding covered with upholstery and supported by a structure comprising a substantially vertical back plate, to which is coupled the edge of the upholstery. The structure also comprises a metallic framework, which is formed by a tube having a ring shape, is arranged on the front surface of the plate, and is fixed to the plate itself. Normally, the back surface of the plate is covered by a panel made of plastic material, so as to define an aesthetic lining, towards the trunk.

The metal framework comprises an upper crossbar, generally supporting the rods of a headrest. In particular, the rods can slide in respective guide bushings, made of plastic material and inserted in respective metal tubes, which in turn are fixed to the upper crossbar of the metal framework by way of welded brackets.

The need arises for simplifying the coupling type of the headrest rods to the seat metal framework, so as to reduce the number of components and, possibly, reduce the assembly procedures necessary for securing the plastic guide bushings to the metallic framework.

SUMMARY OF THE INVENTION

The aim of the present invention is to make a seat backrest for a motor vehicle, which allows to fulfill of the abovementioned need in a simple and economic way.

According to the present invention a seat backrest for a motor vehicle is achieved, as defined in claim 1.

BRIEF DESCRIPTION OF THE DRAWINGS

For a better understanding of the present invention a preferred embodiment is now described, purely by way of example without limitation, with reference to the attached drawings in which.

DETAILED DESCRIPTION OF THE INVENTION

Figure 1:
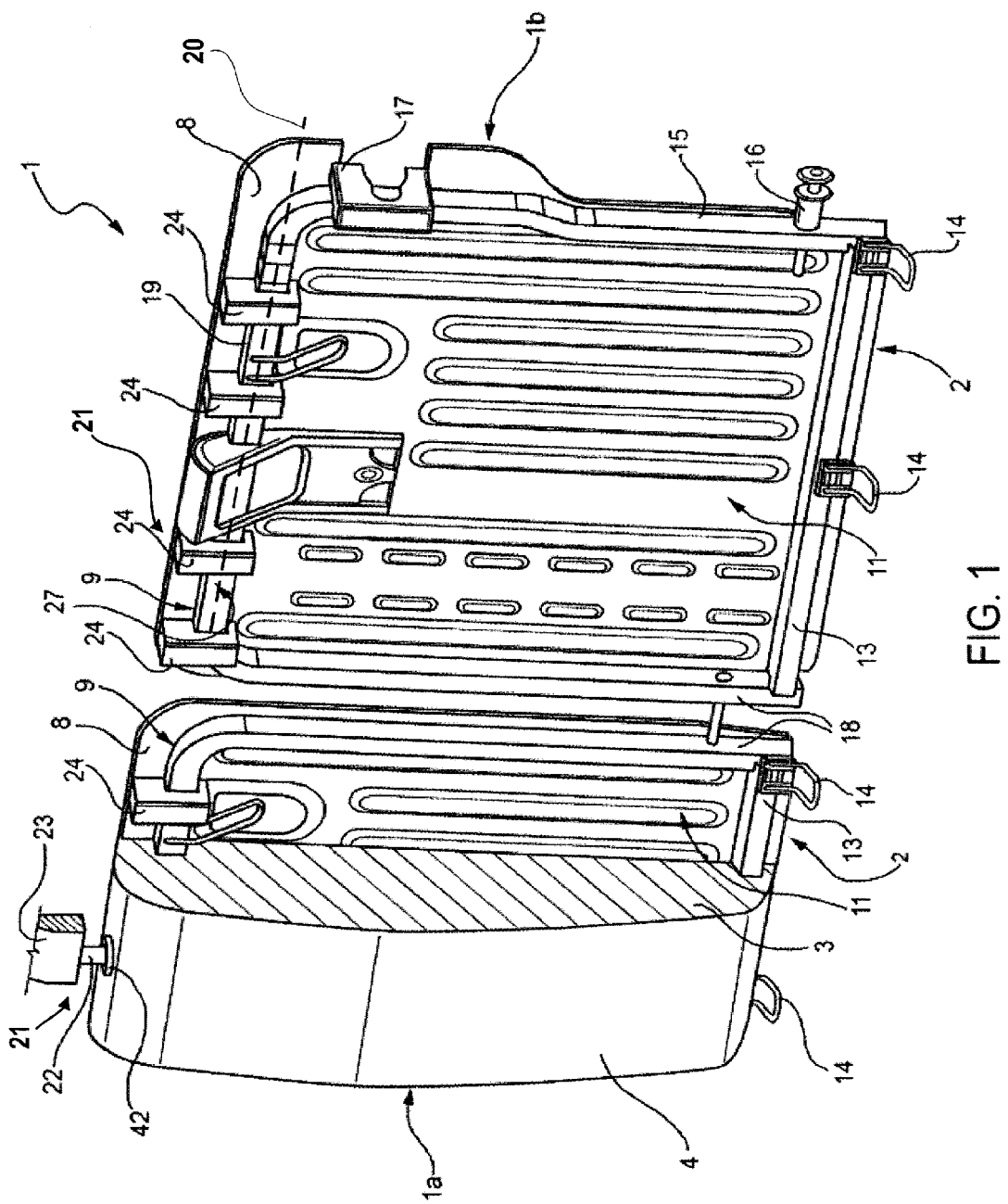
FIG. 1 is a perspective view showing, with parts removed for clarity, a preferred embodiment of the seat backrest for a motor vehicle according to the present invention.

In FIG. 1, with 1 is indicated as a whole, a seat backrest, mounted in a last row of seats in a motor vehicle.

The backrest 1 is preferably divided into two parts, indicated as 1*a* and 1*b*, arranged one on the right and one on the left. Each part 1*a*, 1*b* comprises a back structure 2, preferably made of metal material; a padding 3 (partially shown) made for example of foam material, and supported by the structure 2, and an upholstery 4 (partially shown), made for example of fabric, and covering the front and the sides of the padding 3.

The structure 2, in turn, comprises a back plate 8 and a front framework 9. The back surface of the plate 8 can possibly be covered by a lining panel (not shown), which is preferably made of plastic material, frontally defines a front luggage compartment (not shown) of the motor vehicle and is attached to the framework 2 in a known way, for example by way of buttons that are snap coupled to the plate 8.

The plate 8 is preferably made in one piece of metal or plastic material, and is delimited by a front surface 11 on which the padding 3 rests. The upholstery 4 is coupled to the plate 8 and, in particular, ends with an edge fixed in a known and not illustrated way to the edge of the plate 8.

The framework 9 is placed in front of surface 11, is fixed to the plate 8 in a known and not fully described way, and is made of metallic material. The framework 9 is defined by a tube, i.e. an element having a closed cross section, which preferably is made by a plurality of pieces welded together in order to obtain a ring shape. Alternatively, the framework 9 is defined by a single tubular piece bent to obtain the ring shape.

The framework 9 lies substantially on a plane parallel to the plate 8 and comprises: a lower crossbar 13, which is substantially horizontal and supports attachment elements 14 for connecting a child seat with Isofix-type latches (not shown); an external side upright 15, which supports a hinge device 16 and a coupling element 17 to couple the part 1*a*, 1*b* in a fixed position to a stop device or a lock (not shown) in the motor vehicle; an internal side upright 18, hinged to the upright 18 of the other part 1*a*, 1*b*; and an upper crossbar 19, which is substantially horizontal, extends along an axis 20 and supports at least one pair of coupling members 21, 22 provided for connecting two rods 22 of a headrest 23 to the framework 9.

Figure 2:
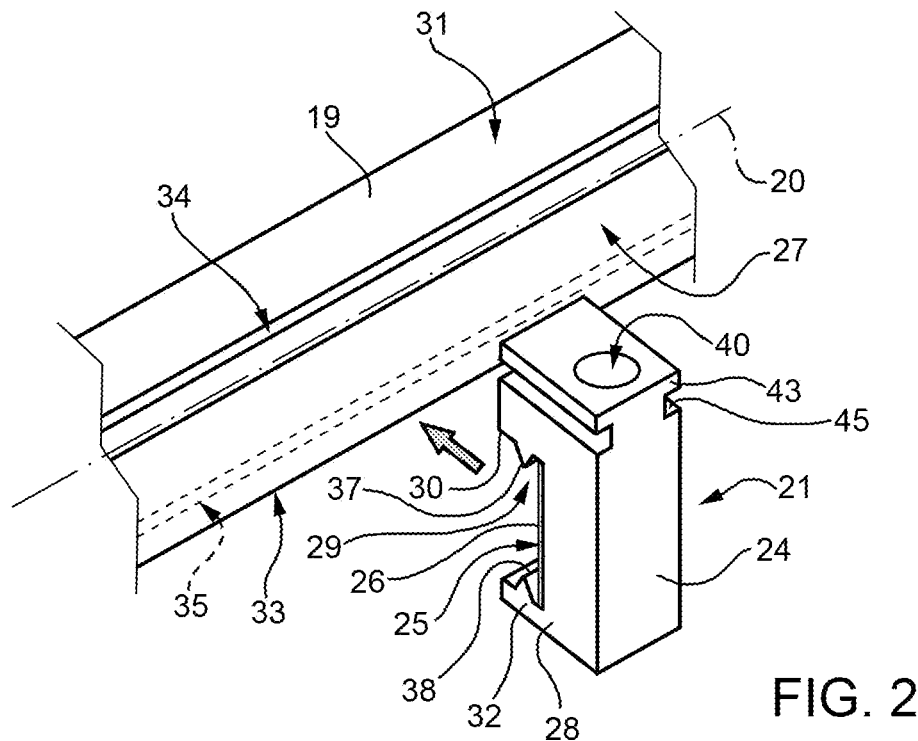
FIG. 2 illustrates in an exploded and enlarged scale a detail of the backrest of FIG. 1.

With reference to FIG. 2, each connecting element 21 comprises a guide 24, which is made of plastic material and, according to the invention, is directly fixed to the crossbar 19 by gluing.

In particular, the guide 24 comprises a surface 25 coated with a adhesive layer 26 which, during assembly, is laid on a front surface 27 of the crossbar 19. The surface 25 has a shape mating that of the surface 27. In particular, the surfaces 25 and 27 are flat surfaces.

The guide 24 comprises a rear portion 28 being fork-shaped so as to define a housing 29, which is frontally delimited by the surface 25, on the top by an arm 30 arranged on an upper surface 31 of the crossbar 19, and below by an arm 32 arranged below a bottom surface 33 of the crossbar 19.

The surfaces 31 and 33 have respective grooves 34, 35, which are parallel to the axis 20 and are set apart of predetermined distances from the upper and lower edges of the surface 27. At the same time, the arms 30 and 32 extend along directions that are parallel to each other and orthogonal to the axis 20. The portion 28 comprises two teeth 37, 38, which respectively protrude in the housing 29 from arms 30, 32 so as to respectively engage the grooves 34, 35.

The distance of the teeth 37, 38 from the surface 25 is equal to (or slightly less) the distance of the grooves 34, 35 from the surface 27, so as to keep the adhesive layer 26 pressed between the surfaces 25, 27 after the arms 30 and 32 were snap coupled to the grooves 34, 35. In fact, during assembly, the portion 28 is fit around the crossbar 19 and the guide 24 is pressed towards the surface 27, deforming the adhesive layer 26 until the teeth 37, 38 enter into the grooves 34, 35. After the snapping of the teeth 37, 38 into the grooves 34, 35, the arms 30, 32 remain in tension due to the compression of the adhesive material. Therefore, the portion 28 not only helps to retain the guide 24 coupled to the crossbar 19, but keeps the adhesive material constantly in contact with the surfaces 25, 27 during the polymerization. In this way, no additional equipment is needed to push the guides 24 in contact against the crossbar 19 during the polymerization of the adhesive material.

Figure 3:
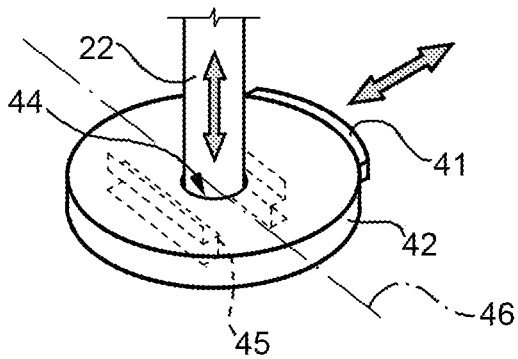
FIG. 3 illustrates a component of the backrest of FIG. 1.

The guides 24 comprise respective guide holes 40 adapted to be slidingly engaged, respectively, by the rods 22 of the headrest 23. With reference to FIG. 3, to stop the rods 22 in a fixed position during the height adjustment of the headrest, one of the two coupling members 21 comprises a releasable stop device 41 carried by a cap 42, which is also made of plastic, coupled to an upper end portion 43 of the guide 24 and has a through opening defining an inlet 44 for inserting the rod 22 into the guide hole 40.

Preferably, the cap 42 is coupled to the portion 43 after foaming and upholstery operations on the backrest 1. After such operations, the portion 43 protrudes from the top or is placed flush with the upholstery 4. Therefore, at completed assembly, the cap 42 remains visible and its releasable stop device 41 is accessible above the upholstery 4 in order to manually adjust the headrest in height.

The other of the two coupling members 21 is devoid of the releasable stop device 41, but still has a cap (not shown) which remains visible and is connected at the upper end of the relative guide 24.

The coupling method between the cap 42 and the portion 43 may be of different types. For example, in the embodiment of FIGS. 2 and 3, the cap 42 is coupled to the portion 43 by way of a guide and slide system 45, which defines a sliding direction 46 orthogonal to the axis of the guide hole 40.

Figure 4:
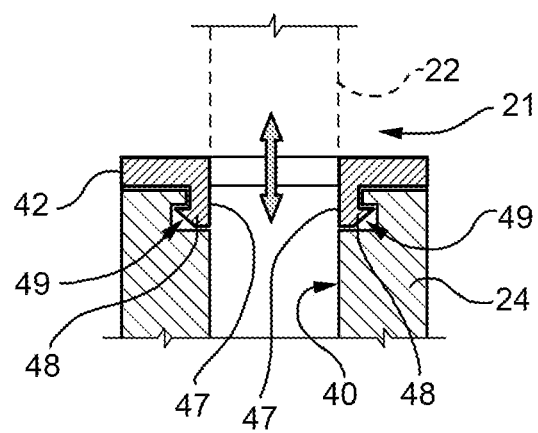
FIG. 4 illustrates a variant of the component of FIG. 3.

According to the variant shown in FIG. 4, on the other hand, the cap 42 is snap coupled to the portion 43. In particular, the cap 42 comprises two arms 47 which are parallel to the axis of the guide hole 40 and have respective teeth 48 that radially protrude outwards and engage respective seats 49 made in the guide 24. After the snap coupling of the teeth 48 in the seats 49, the gap between the arms 47 defines an extension towards the top of the guide hole 40. The rod 22, after being inserted through the inlet 44, maintains the arms 47 apart and therefore stably maintains the teeth 48 in the seats 49.

From the foregoing, it is clear that the parts 1a, 1b have a relatively low number of components, because the plastic guides 24 are coupled directly to the crossbar 19, i.e. without using additional metal components, which are instead used in the known art and which must be welded to the crossbar 19. At the same time, the connection method is stable and allows to meet the requested requirements in case of a possible accident.

The coupling operations of the guides 24 to the crossbar 19 are relatively fast and do not require any special equipment for maintaining the components in fixed relative positions during the consolidation of the adhesive material. In fact, it is sufficient to perform the following steps: possibly preparing the surfaces 25, 27 for gluing, applying the adhesive material, snap coupling the guides 24 on the crossbar 19 in the axial position as designed and allowing the polymerization of the adhesive material.

The fact of making the cap 42 as a component separate from the relative guide 24 allows to standardize the production of the cap 42, while freely allowing to produce guides 24 having different heights, and/or having housings 29 of different shapes and/or sizes, depending on the type of framework that must be coupled to the guide 24. Alternatively, the guide 24 can be standardized for seats with the same type of crossbar 19, and make dedicated caps, particularly having different heights to compensate for differences in thickness of the padding 3 above the crossbar 19 itself.

The grooves 34, 35 freely allow the placing of the guides 24 in slightly different positions along the axis 20, for which the coupling method described is easily adapted for backrests having relative positioning between rods 22 and crossbar 19 different one from the other.

From the foregoing it appears, finally, clear that to the described and illustrated backrest 1 changes and variations may be applied without going beyond the protection scope of the present invention, as defined in the appended claims.

In particular, the finishing rear panel may be absent, and/or the plate 8 and/or the element 9 may be made of material other than metal indicated above, such as plastic or a composite material, particularly for improving the lightness of the structure 2, but strong enough as to not compromise security requirements (i.e. the anti-intrusion of luggage in the interior compartment from the rear luggage compartment).

In addition, the backrest 1 could occupy the entire interior compartment, without being divided into two parts 1a, 1.

In addition, the surface 25 could be glued to a surface of the crossbar 19 different from the surface 27; for example, the arms 30, 32 may be parallel to the axis of the guide hole 40, in order to fit the guide 24 on top of the crossbar 19.

In addition, the slots 34, 35 could be replaced by grooves of a relatively small length, without freely allowing positioning along the axis 20.

Finally, the coupling method between the guides 24 and the crossbar 19 could also be applied to a front seat backrest for a motor vehicle.

The invention claimed is:

1. A seat backrest for a motor vehicle, the backrest comprising:
   a framework comprising an upper crossbar which is substantially horizontal;
   at least two coupling members comprising respective guides, made of plastic material, directly fixed to said upper crossbar and having respective guide holes designed to be slidingly engaged by respective rods of a headrest;
   a padding supported by said framework; and
   an upholstery covering said padding;
   wherein said guides are directly fixed to said upper crossbar by means of adhesive material;
   wherein each said guide comprises a holding portion which comprises a snap coupling for retaining the guide to the upper crossbar, wherein the snap coupling, in addition to retaining the guide to the upper crossbar, also keeps the adhesive material pressed between, and in contact with, the guides and said upper crossbar;
   wherein the snap coupling comprises a fork portion defining a housing engaged by said upper crossbar;
   wherein the fork portion comprises two side arms and two teeth, which respectively protrude from said side arms in said housing and engage respective indents formed in said upper crossbar.

2. The seat backrest according to claim 1, wherein said adhesive material is in the form of an adhesive layer placed between a coupling surface of each said guide and an attachment surface of said upper crossbar, said coupling and attachment surfaces having mating shapes.

3. The seat backrest according to claim 2, wherein said coupling and attachment surfaces have a flat shape.

4. The seat backrest according to claim 3, wherein said attachment surface is a front surface of said upper crossbar.

5. The seat backrest according to claim 1, wherein said indents are defined by elongated grooves parallel to an axis of said upper crossbar.

6. The seat backrest according to claim 1, wherein said coupling members further comprise respective caps made of plastic material as pieces separate from said guides, arranged in sight upon said upholstery, connected to an upper end portion of said guides, and defining an inlet aligned with said guide holes.

7. The seat backrest according to claim 6, wherein one of said caps carries a releasable stop device manually operable to stop in height the respective rod.

8. The seat backrest according to claim 1, wherein the backrest is part of a rear seat and comprises a supporting plate arranged behind said framework, attached to said framework and having a front surface on which said padding lays.

9. A seat backrest for a motor vehicle, the backrest comprising:
   a framework comprising an upper crossbar which is substantially horizontal;
   at least two coupling members comprising respective guides, made of plastic material, are directly fixed to said upper crossbar and have respective guide holes designed to be slidingly engaged by respective rods of a headrest;
   a padding supported by said framework;
   an upholstery covering said padding;
   wherein said guides are directly fixed to said upper crossbar by means of adhesive material;
   wherein each said guide comprises at least a holding portion, which is snap coupled to said upper crossbar;
   wherein said holding portion is a fork portion defining a housing engaged by said upper crossbar; and
   wherein said fork portion comprises two side arms and two teeth, which respectively protrude from said side arms in said housing and engage respective indents formed in said upper crossbar.

10. A seat backrest for a motor vehicle, the backrest comprising:
    a framework comprising an upper crossbar which is substantially horizontal;
    at least two coupling members comprising respective guides, made of plastic material, directly fixed to said upper crossbar and having respective guide holes designed to be slidingly engaged by respective rods of a headrest;
    a padding supported by said framework; and
    an upholstery covering said padding;
    wherein said guides are directly fixed to said upper crossbar by means of adhesive material;
    wherein each said guide comprises a holding portion which comprises a snap coupling for retaining the guide to the upper crossbar, wherein the snap coupling, in addition to retaining the guide to the upper crossbar, also keeps the adhesive material pressed between, and in contact with, the guides and said upper crossbar; and
    wherein the snap coupling keeps the adhesive material pressed between, and in contact with, the guides and said upper crossbar during polymerization of the adhesive material.

\* \* \* \* \*